No. 667,103. Patented Jan. 29, 1901.
H. R. SARGENT.
INSULATOR.
(Application filed Aug. 31, 1900.)
(No Model.)
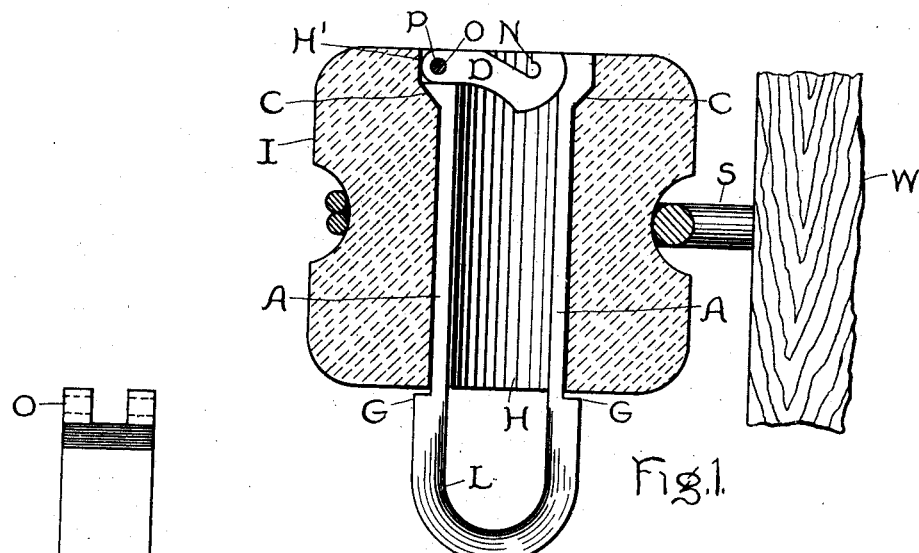
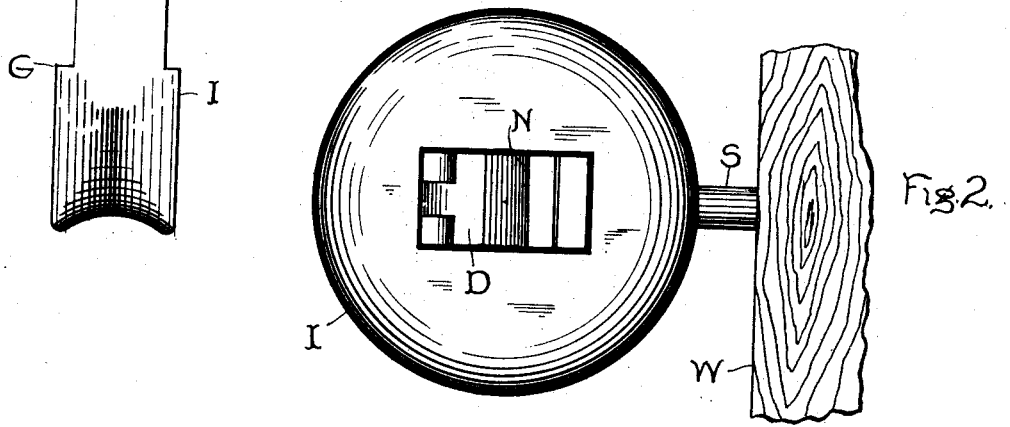
Witnesses
Inventor
Howard R. Sargent
by Albert G. Davis
Atty.

UNITED STATES PATENT OFFICE.

HOWARD R. SARGENT, OF SCHENECTADY, NEW YORK, ASSIGNOR TO THE GENERAL ELECTRIC COMPANY, OF NEW YORK.

INSULATOR.

SPECIFICATION forming part of Letters Patent No. 667,103, dated January 29, 1901.

Application filed August 31, 1900. Serial No. 28,655. (No model.)

*To all whom it may concern:*

Be it known that I, HOWARD R. SARGENT, a citizen of the United States, residing at Schenectady, county of Schenectady, State of New York, have invented certain new and useful Improvements in Insulators, (Case No. 1,551,) of which the following is a specification.

This invention relates to insulating supports or hangers for wires or cables which conduct electric currents; and it consists of a hanger composed of an insulating-body and combined parts hereinafter described, by means of which a lineman may quickly and securely insert the cable in the hanger without threading it therethrough.

Figure 1 is a vertical section of the hanger with the supporting-loop shown in full lines. Fig. 2 is a plan view of the hanger, and Fig. 3 is a side elevation of the supporting-loop L.

Devices of this kind, which are usually attached to lofty supports, should be capable of being operated very quickly on account of the danger from live wires, as well as severe weather, to which the lineman may be exposed, and also because of the economy in time. To this end it is desirable that nearly all the labor should be performed on the hanger by the manufacturer and that the least possible manipulation for the final operative assemblage be left to the lineman. Hence any device which requires operations of riveting, screwing, bolting, or bending various parts is distinctly disadvantageous. On the other hand, a device which can be quickly assembled but is at the same time highly complex or difficult to make is almost equally undesirable. The number of parts to be assembled should be a minimum, since no matter how quickly they are capable of assemblage it is a positive disadvantage to require a lineman to hold several extra parts together while assembling. It is obvious that low cost of production is also desirable. Furthermore, it is essential that the parts can be so firmly secured together that there is danger of the conducting wire or cable becoming detached and thus causing serious damage to neighboring life or property. If a device be adapted to be readily assembled by a lineman, but if its parts are not adapted to be properly secured together, the device is not satisfactory. A method of riveting parts together would be satisfactory so far as a secure fastening is concerned, but such a method would not possess the advantage of quick assemblage, nor indeed of being readily taken apart, which is of as much or greater importance than quick assemblage. Screw-threaded connections might be efficient in making a device secure if they are otherwise secured; but if one of the parts be rotatable with respect to the other there is danger that the parts will be loosened; but in any event the screw-threaded connection takes too long a time for a lineman to assemble in the case of devices of this kind, where an instantaneous connection should be had if possible. It is also highly desirable that the device should be adapted to receive the wire or cable without threading the latter through it, so that not only may the work of originally stringing the wires be greatly facilitated, but that the hangers may be connected in at any desired place at any time after the wire or cable has been strung. Another important requirement is that the parts which directly support the wire should be sufficiently rigid and strong, so that they will not bend or break under any strain to which the wire may subject them in order that the latter may be prevented from detachment.

A device constructed in accordance with my invention embodies all the above-described advantages with others, which will be described hereinafter.

As shown in Fig. 1, the device consists of only two parts, one of which has a hole entirely through it and the other is open at one end, and when the parts are separated the latter part, having the opening at one end, is lifted up around the wire from beneath, like a net under a fish, and that part is then forced into the hole in the other part, where it is automatically locked. Probably no simpler device could be conceived.

As shown in Figs. 1 and 2, the device is secured to a support W by any suitable means S, which forms no part of my invention. The member I of insulating material, such as porcelain, is mounted upon the support S. This insulating member I is formed with a hole H, extending entirely through it, which hole is enlarged at its upper end, as shown at H'. The insulator may be mounted upon the support S by the lineman before he need concern himself with securing the wire in place. A single member only, which the lineman can manipulate with one hand, is required to secure the wire in position. This member is the loop L, the arms A of which are secured in the hole of the insulator. These arms have a certain amount of elasticity, so that after the lineman has lifted the loop up around the wire he brings the upper ends of the arms toward each other and forces them up through the hole H. The ends of the arms are thicker than the other parts, and so as soon as the loop has been forced a sufficient distance into the hole these enlarged ends of the arm expand into the enlarged portion H' of the hole in the insulator. Generally if the arms have considerable elasticity this device would be sufficient to secure the loop within the hole in the insulator against all possible forces tending to withdraw it. However, as an additional precaution a wedge D is pivoted upon a pin P, extending through a hole O in the enlarged end of the left-hand arm A. This wedge may be used to add to the effect of the spring-arms, or it may be used when the arms lack elasticity, but are movable, as the sole means of moving and maintaining the enlarged ends of the arms in the enlarged hole H'. The inside of the end of the right-hand arm A is formed with a curved surface, the end of the wedge D being correspondingly curved to engage therewith, so that a blow on the top of the wedge will drive it down into engagement with the arm and loop, where it will be maintained by the curvature in that position and can be as readily removed by force. As it is not convenient in separating the parts to knock the wedge out from underneath, suitable means is provided whereby the wedge can be pulled open from the top, such as the notch N, in which a screw-driver or other suitable instrument may be inserted for this purpose.

As shown in Fig. 1, the drop from the narrow portion of the hole H in the insulator I to the enlarged portion H' is not abrupt, the inclined portion C being formed in the wall of the hole. A similar incline is formed on the enlarged ends of the arms A, and hence the wedge D being absent or raised from engagement the lower end of the loop L can be grasped and the entire loop be removed from the insulator by a quick jerk, which causes the arms A to be forced toward each other. The edges of the lower portion of the loop flare in order to prevent the abrasion of the insulating-covering of a cable. These flared edges form lugs G, which engage the bottom of the insulator in order to prevent the loop from moving entirely through the hole. If these lugs were not formed on the lower portion of the loop, it would be necessary to provide an equivalent check on the upper portion of the insulator. As shown in Fig. 1, these lugs or shoulders are so situated that they leave sufficient space between the lowest part of the loop and the bottom of the insulator to permit a great range of movement for the relatively small wire. This is advantageous when it is desired that the wire may be given this freedom of movement; but it will readily be seen that the shoulders may be situated lower down on the loop, so that the wire may be held in a fixed position between the loop and the insulator.

The invention consists in a simple and quickly-operated device for suspending wire, and the essential features involved may be adapted for various uses. For example, the lower portion of the loop might readily be adapted to serve to support a trolley-wire.

As shown in Fig. 2, the parts of the enlarged portion of the left-hand arm A are rounded at their corners to permit the free movement of the wedge D, which is pivoted between them.

Having thus described my invention, what I claim as new, and desire to secure by Letters Patent, is—

1. In an insulating-hanger, the combination with a supporting-loop having one end open for the reception of the conducting-wire, of an insulator formed with a hole into which the free ends of the loop are forced to automatically hold them in position, thus including the conducting-wire between the insulator and the closed end of the loop.

2. In an insulating-hanger, the combination with a supporting-loop, having one end open for the reception of the conducting-wire, the free ends of the loop being elastic, of an insulator formed with a hole into which the free ends of the loop are forced, so that they expand against the walls of the hole to hold the loop in the insulator.

3. An insulator formed with a hole, in combination with an open-ended U-shaped conductor-support, the ends of which are removably secured to the walls of the hole.

4. A conductor-support, which comprises an insulator formed with a hole, in combination with a supporting-loop having one end open for the reception of the conducting-wire, the free ends of the loop being secured to the walls of the hole so as to leave a space for the conducting-wire between the insulator and the curved portion of the loop.

5. A conductor-support, which comprises an insulator formed with a hole, in combination with a U-shaped support, the ends of which are secured in position in the hole.

6. The combination with an insulator formed with a hole which is enlarged toward one end, of a supporting-loop having spring-arms which are compressed and inserted in the hole and expanded into the enlarged portion to hold the loop in the insulator.

7. The combination with an insulator formed with a hole, of a supporting-loop having movable arms which extend into the hole in the insulator, and a wedge for spreading the arms against the walls of the hole to hold the loop in the insulator.

8. The combination with an insulator formed with a hole, of a supporting-loop having movable arms which are held in the hole, and a wedge pivoted to one arm and adapted to engage the other arm to spread the arms against the walls of the hole, and thus secure the loop within the insulator.

9. The combination with an insulator formed with a hole having an enlarged portion, of a supporting-loop having movable arms which extend in the hole, and a wedge for spreading the arms in the enlarged portion of the hole to hold the loop in the insulator.

10. The combination with an insulator formed with a hole having an enlarged portion, of a supporting-loop having movable arms with enlarged portions, which arms extend into the hole, their enlarged portions engaging with the enlarged portions of the hole, to hold the insulator in the support.

11. The combination with an insulator having a hole formed with an enlarged portion and an incline connecting the portions of different size, of a supporting-loop having movable arms which extend into the hole in the insulator, the ends of which arms are enlarged and formed with an incline connecting the narrow and enlarged portions, the inclined parts of the insulator and support coöperating to permit the withdrawal of the support from the hole in the insulator.

12. The combination with an insulator formed with a hole having an enlarged portion, of a supporting-loop provided with movable arms the ends of which are enlarged, and a wedge pivoted in one of said enlarged ends and adapted to engage the other arm to expand the enlarged ends into the enlarged portion of the hole in the insulator.

13. The combination with an insulator formed with a hole, of a supporting-loop having elastic arms, and a wedge adapted to coöperate with the elastic arms to secure the loop in the insulator.

14. The combination with an insulator formed with a hole having an enlarged portion, of a supporting-loop having spring-arms, the ends of which are correspondingly enlarged, and a wedge pivoted to the enlarged end of one arm.

15. The combination with an insulator formed with a hole, of a supporting-loop having movable arms which engage in the hole, a wedge, and curved surfaces formed on the wedge and loop to lock the parts in position and permit their easy separation.

16. The combination with an insulator formed with a hole, of a supporting-loop having movable arms which extend into the hole, a wedge for expanding the arms, and means on the upper part of the wedge for removing it from between the arms.

17. The combination with an insulator formed with a hole, of a supporting-loop having movable arms which extend into the hole, and lugs or shoulders on the arms adapted to engage the outside of the insulator.

18. The combination with an insulator formed with a hole having an enlarged portion, of a supporting-loop having movable arms with correspondingly-enlarged portions extending into the hole, and lugs or shoulders on the arms to coöperate with the insulator and the enlarged portions of the arms to hold the insulator and loop securely together.

19. The combination with an insulator formed with an opening of a certain dimension, of a supporting-loop formed with movable arms, having enlarged ends which extend through and beyond said opening, and lugs on the arms which engage with the insulator where the arms enter the opening.

20. The combination with an insulator, of a supporting-loop formed of a strip of metal, the ends of which are removably attached to the insulator, and the edges of which flare out to prevent abrasion of the cable insulation.

21. The combination with an insulator formed with a hole, of a supporting-loop, the ends of which are removably fixed in the hole, the edges of the lower portion of the loop being made flaring to prevent the abrasion of the cable insulation, and to form lugs which engage the lower side of the insulator.

In witness whereof I have hereunto set my hand this 29th day of August, 1900.

HOWARD R. SARGENT.

Witnesses:
  BENJAMIN B. HULL,
  FRED RUSS.